United States Patent
Svensson et al.

(10) Patent No.: US 10,067,240 B1
(45) Date of Patent: Sep. 4, 2018

(54) X-RAY DETECTOR SYSTEM BASED ON PHOTON COUNTING

(71) Applicant: Prismatic Sensors AB, Stockholm (SE)

(72) Inventors: Christer Svensson, Linkoping (SE); Mats Persson, Vasterhaninge (SE); Martin Sjolin, Stockholm (SE); Mats Danielsson, Taby (SE)

(73) Assignee: PRISMATIC SENSORS AB, Stockholm (SE)

( * ) Notice: Subject to any disclaimer, the term of this patent is extended or adjusted under 35 U.S.C. 154(b) by 0 days.

(21) Appl. No.: 15/450,653

(22) Filed: Mar. 6, 2017

(51) Int. Cl.
*G01T 1/24* (2006.01)
*G01T 1/18* (2006.01)

(52) U.S. Cl.
CPC . *G01T 1/18* (2013.01); *G01T 1/24* (2013.01)

(58) Field of Classification Search
CPC .. G01T 1/247; G01T 1/17; G01T 1/18; G01T 1/24; G01T 1/16; G06T 2207/10081; G06T 2207/10116
USPC .................................................. 250/370.06
See application file for complete search history.

(56) References Cited

U.S. PATENT DOCUMENTS

| | | | |
|---|---|---|---|
| 7,149,278 B2 | 12/2006 | Arenson et al. | |
| 7,330,527 B2 | 2/2008 | Hoffman et al. | |
| 7,868,665 B2* | 1/2011 | Tumer | H03F 3/087 327/509 |
| 8,378,310 B2 | 2/2013 | Bornefalk et al. | |
| 8,598,536 B2* | 12/2013 | Jarron | A61B 6/037 250/363.04 |
| 9,482,764 B1* | 11/2016 | Shahar | G01T 7/005 |
| 2002/0145115 A1 | 10/2002 | Nygard et al. | |
| 2004/0017224 A1* | 1/2004 | Tumer | H03F 3/087 327/51 |
| 2005/0116139 A1 | 6/2005 | Mikkelsen et al. | |
| 2008/0099689 A1* | 5/2008 | Nygard | G01T 1/2018 250/370.09 |
| 2008/0149842 A1 | 6/2008 | El-Hanany et al. | |

(Continued)

FOREIGN PATENT DOCUMENTS

WO 2011002452 1/2011

OTHER PUBLICATIONS

International Search Report—PCT/SE2018/050092—dated Apr. 19, 2018.
Written Opinion—PCT/SE2018/050092—dated Apr. 19, 2018.

*Primary Examiner* — Taeho Jo
(74) *Attorney, Agent, or Firm* — Young & Thompson

(57) ABSTRACT

Disclosed is an x-ray detector system including a multitude of detector elements, each connected to a respective photon counting channel for providing at least one photon count output, and a read-out unit connected to the photon counting channels for outputting the photon count outputs. Each one of at least a subset of the photon counting channels includes at least two photon counting sub-channels, each photon counting sub-channel providing at least one photon count output and having a shaping filter, wherein the shaping filters of the photon counting sub-channels are configured with different shaping times, and wherein the photon counting sub-channels, having shaping filters with different shaping times, are adapted for counting photons of different energy levels. Furthermore, the read-out unit is configured to select, for each photon counting channel, photon count outputs from the photon counting sub-channels.

21 Claims, 8 Drawing Sheets

(56) References Cited

U.S. PATENT DOCUMENTS

| | | |
|---|---|---|
| 2008/0169422 A1 | 7/2008 | Shahar et al. |
| 2010/0193700 A1* | 8/2010 | Herrmann ............... G01T 1/171 |
| | | 250/395 |
| 2010/0215230 A1 | 8/2010 | Bornefalk et al. |
| 2012/0326045 A1 | 12/2012 | Seino et al. |
| 2014/0183371 A1* | 7/2014 | Roessl .................... G01T 1/241 |
| | | 250/370.09 |
| 2014/0328465 A1* | 11/2014 | Herrmann ................. G01T 1/17 |
| | | 378/62 |
| 2016/0266054 A1* | 9/2016 | Cao ...................... A61B 6/4241 |
| 2017/0016998 A1* | 1/2017 | Shahar .................... G01T 1/241 |
| 2017/0086761 A1 | 3/2017 | Fu et al. |

* cited by examiner

X-RAY DETECTOR SYSTEM BASED ON PHOTON COUNTING

TECHNICAL FIELD

The proposed technology relates to radiographic imaging such as x-ray imaging and related x-ray detector systems.

BACKGROUND

Radiographic imaging such as x-ray imaging has been used for years in medical applications and for non-destructive testing.

Normally, an x-ray imaging system includes an x-ray source and an x-ray detector system. The x-ray source emits x-rays, which pass through a subject or object to be imaged and are then registered by the x-ray detector system. Since some materials absorb a larger fraction of the x-rays than others, an image is formed of the subject or object.

A challenge for x-ray imaging detectors is to extract maximum information from the detected x-rays to provide input to an image of an object or subject where the object or subject is depicted in terms of density, composition and structure. It is still common to use film-screen as detector but mostly the detectors today provide a digital image.

Modern x-ray detectors normally need to convert the incident x-rays into electrons, this typically takes place through the photoelectric effect or through Compton interaction and the resulting electron are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

There are detectors operating in an integrating mode in the sense that they provide an integrated signal from a multitude of x-rays and the signal is only later digitized to retrieve a best guess of the number of incident x-rays in a pixel.

Photon counting detectors have also emerged as a feasible alternative in some applications; currently those detectors are commercially available mainly in mammography. The photon counting detectors have an advantage since in principal the energy for each x-ray can be measured which yields additional information about the composition of the object. This information can be used to increase the image quality and/or to decrease the radiation dose.

When using simple semiconductor materials, as Silicon or Germanium, Compton scattering causes many x-ray photons to convert from a high energy to a low energy before conversion to electron-hole pairs in the detector. This results in a large fraction of the x-ray photons, originally at a higher energy, producing much less electron-hole pairs than expected, which in turn results in a substantial part of the photon flux appearing at the low end of the energy distribution. In order to detect as many of the x-ray photons as possible, it is therefore necessary to detect as low energies as possible.

FIG. 1 is a schematic diagram illustrating examples of the energy spectrum for three different x-ray tube voltages. The energy spectrum is built up by deposited energies from a mix of different types of interactions, including Compton events at the lower energy range and photoelectric absorption events at the higher energy range.

A conventional mechanism to detect x-ray photons through a direct semiconductor detector basically works as follows. The x-ray photons, including also photons after Compton scattering, are converted to electron-hole pairs inside the semiconductor detector, where the number of electron-hole pairs is generally proportional to the photon energy. The electrons and holes are then drifting towards the detector electrodes, then leaving the detector. During this drift, the electrons and holes induce an electrical current in the electrode, a current which may be measured, e.g. through a Charge Sensitive Amplifier (CSA), followed by a Shaping Filter (SF), as schematically illustrated in FIG. 2.

As the number of electrons and holes from one x-ray event is proportional to the x-ray energy, the total charge in one induced current pulse is proportional to this energy. The current pulse is amplified in the Charge Sensitive Amplifier and then filtered by the Shaping Filter. By choosing an appropriate shaping time of the Shaping Filter, the pulse amplitude after filtering is proportional to the total charge in the current pulse, and therefore proportional to the x-ray energy. Following the Shaping Filter, the pulse amplitude is measured by comparing its value with one or several threshold values (Thr) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value (Thr) which has been detected within a certain time frame.

An inherent problem in any Charge Sensitive Amplifier is that it will add electronic noise to the detected current. In order to avoid detecting noise instead of real x-ray photons, it is therefore important to set the lowest threshold value (Thr) high enough so that the number of times the noise value exceeds the threshold value is low enough not to disturb the detection of x-ray photons. The Shaping Filter has the general property that large values of the shaping time will lead to a long pulse caused by the x-ray photon and reduce the noise amplitude after the filter. Small values of the shaping time will lead to a short pulse and a larger noise amplitude. Therefore, in order to count as many x-ray photons as possible, a large shaping time is desired to minimize noise and allowing the use of a relatively small threshold level.

Another problem in any counting x-ray photon detector is the so called pile-up problem. When the flux rate of x-ray photons is high there may be problems in distinguishing between two subsequent charge pulses. As mentioned above, the pulse length after the filter depends on the shaping time. If this pulse length is larger than the time between two x-ray photon induced charge pulses, the pulses will grow together and the two photons are not distinguishable and may be counted as one pulse. This is called pile-up. The only way to avoid pile-up at high photon flux is thus to use a small shaping time.

In conclusion, there is an inherent conflict here; in order to manage noise a large shaping time is needed and in order to manage pile-up a small shaping time is needed.

In practice a compromise value of the shaping time is normally selected, which is neither optimal for low flux nor for high flux. For low flux, the total number of counted X-ray photons will be too low, because we need to choose a too high threshold value, in order to avoid noise induced counts. For high flux, the total number of counted X-ray photons will also be too low, because of the pile-up effect.

U.S. Pat. No. 7,149,278 and U.S. Pat. No. 7,330,527 disclose a method and system for dynamically controlling the shaping time of a photon-counting energy-sensitive radiation detector to accommodate variations in incident flux levels. The system includes a photon counting channel connected to receive signals from a detector element to provide photon counts as output according to a dynamically variable shaping time. The photon counting channel has to be controlled by a separate controller that includes at least a shaping time controller for controlling the variable shaping time in near real-time based on the photon count output data.

Although this provides a possible remedy to the above-mentioned conflict, the solution proposed in U.S. Pat. No. 7,149,278 and U.S. Pat. No. 7,330,527 requires a dynamically controllable high-performance shaping filter and a separate controller therefore with challenging programming for real-time requirements.

U.S. Pat. No. 5,873,054 relates to a method and apparatus for combinatorial logic signal processor in a digitally based high speed x-ray spectrometer, but does not provide a solution, nor relates to the above-mentioned problem.

U.S. Pat. No. 8,378,310 discloses a reset mechanism for at least partially solving the pile-up problem discussed above.

U.S. Pat. No. 9,482,764 relates to a radiation detector system comprising a semiconductor detector having a surface, and plural pixelated anodes disposed on the surface, at least one of the pixelated anodes configured to generate a collected charge signal corresponding to a charge collected by the pixelated anode and to generate a non-collected charge signal corresponding to a charge collected by an adjacent anode to the pixelated anode. The idea k to determine a collected value for the collected charge signal in the pixelated anode, determine a non-collected value for the non-collected charge signal in the pixelated anode corresponding to the charge collected by the adjacent anode, determine a calibrated value for the charge collected by the adjacent anode using the value for the non-collected charge signal adjusted by a calibration factor, and determine a total charge produced by a charge sharing event collected by the pixelated anode and the adjacent anode using the collected value and the calibrated value. The charge sharing event is counted as a single event related to one of the pixelated anode or the adjacent anode if the total charge of the charge sharing event determined using the collected value and the calibrated value exceeds a predetermined value. A combined value corresponding to a sum of the collected charge signal and the non-collected charge signal is determined, and the non-collected value is determined using a difference between the combined value and the collected value. Two different shapers may be used, a first shaper used for generating a first shaped signal and determining the collected value using the first shaped signal, a second shaper (having a higher frequency than the first shaper) used for generating a second shaped signal and determining the combined value using the second shaped signal.

There is thus still a need for an improved or alternative solution to solve the conflicting requirements encountered in photon counting x-ray detectors.

SUMMARY

It is an object to provide an improved x-ray detector system.

Another object is to provide an improved x-ray imaging system.

These objects are met by embodiments of the invention.

According to a first aspect there is provided an x-ray detector system comprising a multitude of detector elements, each connected to a respective photon counting channel (PCC) for providing at least one photon count output, and a read-out unit connected to the photon counting channels for outputting the photon count outputs.

The x-ray detector system is characterized in that each one of at least a subset of the photon counting channels (PCC) comprises at least two photon counting sub-channels, each photon counting sub-channel providing at least one photon count output and having a shaping filter, wherein the shaping filters of the photon counting sub-channels are configured with different shaping times, wherein the photon counting sub-channels, having shaping filters with different shaping times, are adapted for counting photons of different energy levels. Furthermore, the read-out unit is configured to select, for each photon counting channel (PCC), photon count outputs from the photon counting sub-channels.

In this way, an efficient and robust solution for simultaneously managing both noise and pile-up is obtained. The different sub-channels may further be optimized for different energy levels/bins and it is also possible to optimize the effective signal-to-noise ratio at various radiation fluxes.

According to a second aspect there is provided an x-ray imaging system comprising such an x-ray detector system.

Other aspects and/or advantages will be appreciated when reading the following description.

DETAILED DESCRIPTION

Throughout the disclosure, the terms "shaping filter" and "shaper" will be used interchangeably.

Figure 1:
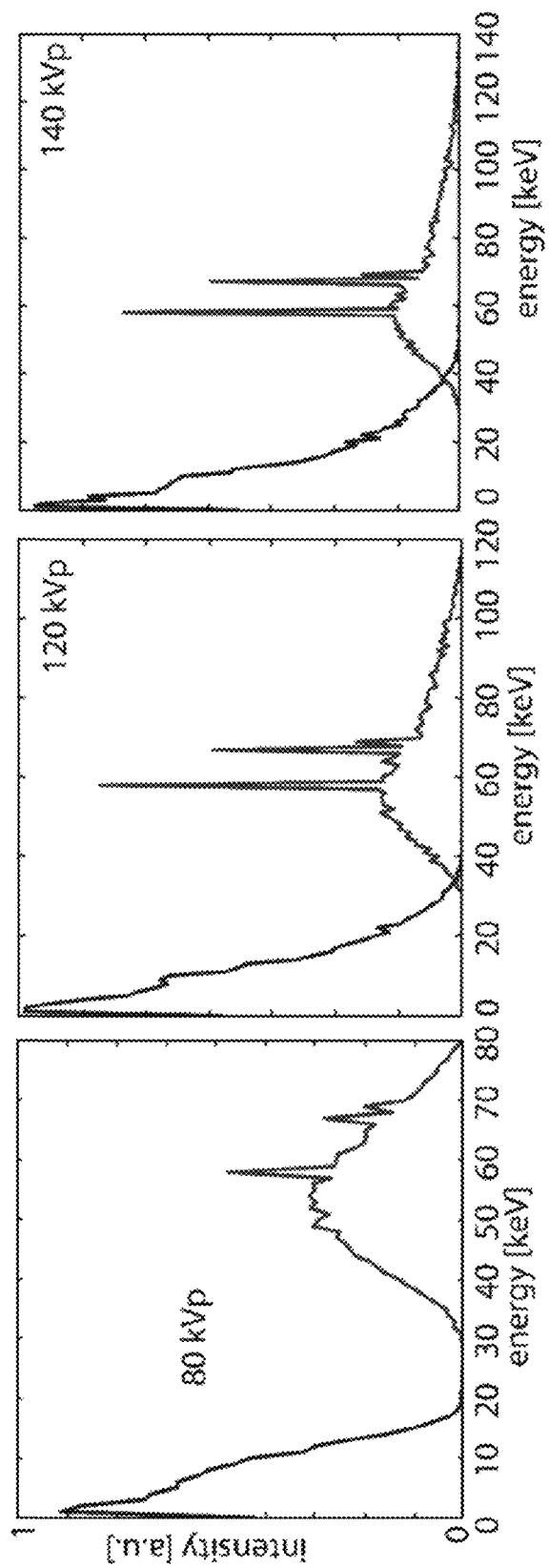
FIG. 1 is a schematic diagram illustrating examples of the energy spectrum for three different x-ray tube voltages.
Figure 2:
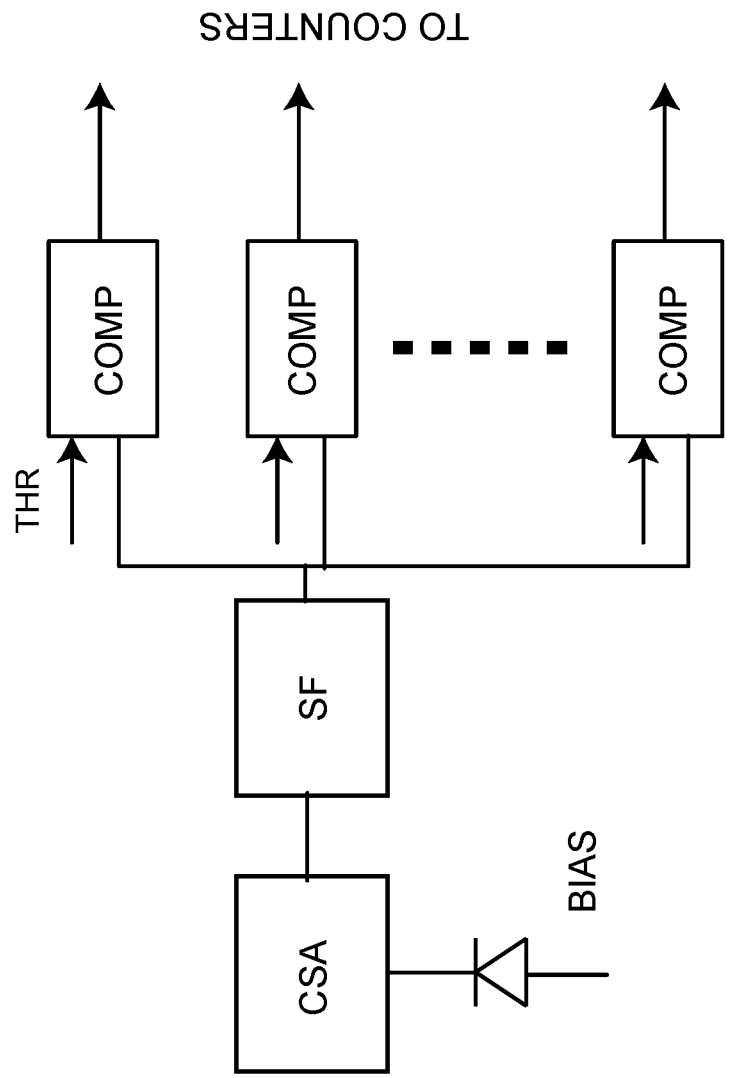
FIG. 2 is a schematic diagram illustrating an example of a photon counting mechanism.
Figure 3:
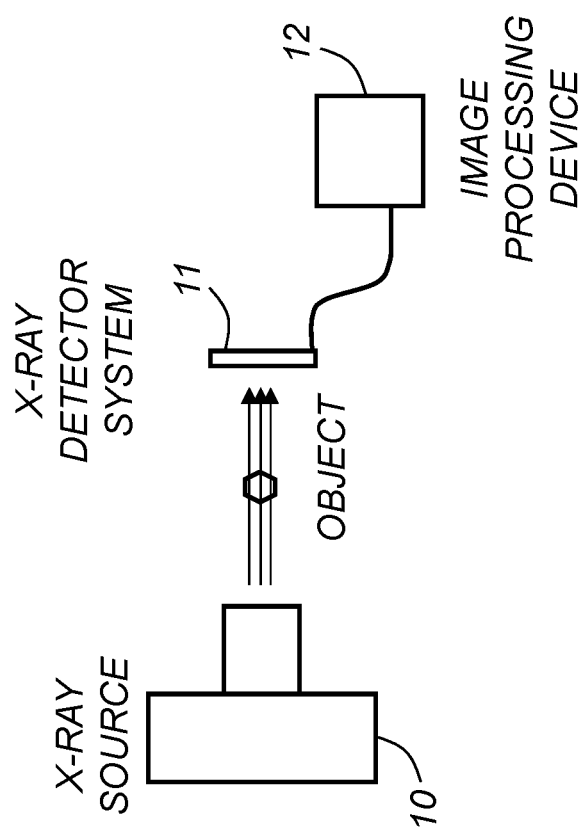
FIG. 3 is a schematic diagram illustrating an example of an overall x-ray imaging system.

It may be useful to begin with a brief overview of an illustrative overall x-ray imaging system, with reference to FIG. 3. In this non-limiting example, the x-ray imaging system basically comprises an x-ray source 10, an x-ray detector system 11 and an associated image processing device 12. In general, the x-ray detector system 11 is configured for registering radiation from the x-ray source 10 that may have been focused by optional x-ray optics and passed an object or subject or part thereof. The x-ray detector system 11 is connectable to the image processing device 12 via suitable read-out electronics (which may be integrated in the x-ray detector system) to enable image processing and/or image reconstruction.

An example of a commonly used x-ray imaging system is a Computed Tomography, CT, system, which may include an x-ray tube that produces a fan or cone beam of x-rays and an opposing x-ray detector system for registering the fraction of x-rays that are transmitted through a patient or object. The x-ray tube and detector system are normally mounted in a gantry that rotates around the imaged object.

The proposed technology is particularly related to photon-counting detectors, for example based on direct detection in simple semiconductor detectors such as detectors based on Silicon or Germanium.

If desired, the proposed technology may also be applicable to energy-resolving detector systems, also referred to as energy-discriminating or multi-bin detectors.

Figure 4:
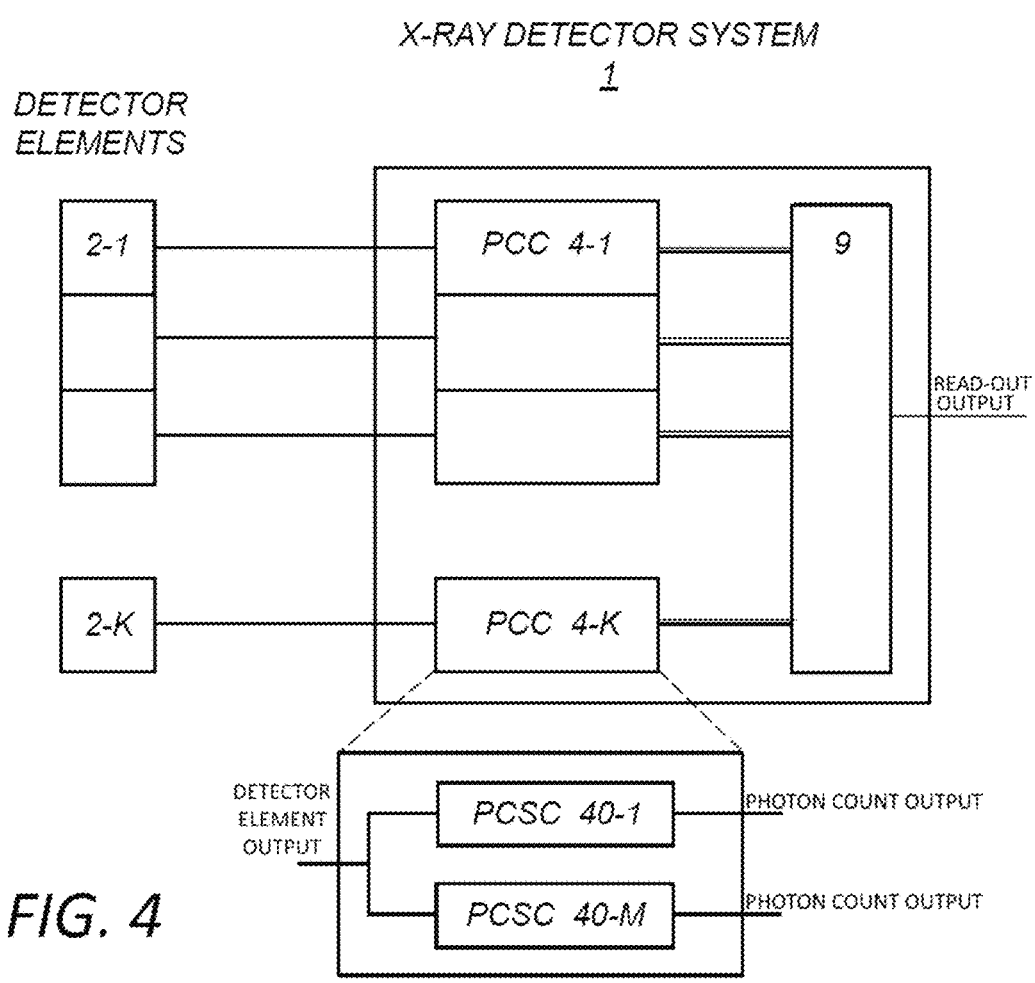
FIG. 4 is a schematic diagram illustrating an example of an x-ray detector system according to an embodiment.

FIG. 4 is a schematic diagram illustrating an example of an x-ray detector system according to an embodiment.

According to a first aspect there is provided an x-ray detector system 1 comprising a multitude of detector elements 2-1 to 2-K, where K≥2, each connected to a respective photon counting channel (PCC) 4-$i$, where i goes from 1 to K, for providing at least one photon count output, and a read-out unit 9 connected to the photon counting channels 4-1 to 4-K for outputting the photon count outputs. The x-ray detector system 1 is characterized in that each one of at least a subset of the photon counting channels (PCC) comprises at least two photon counting sub-channels (PCSC) 40-1 to 40-M, where M≥2, each photon counting sub-channel providing at least one photon count output and having a shaping filter, wherein the shaping filters of the photon counting sub-channels are configured with different shaping times, and that the read-out unit 9 is configured to select, for each photon counting channel (PCC), photon count outputs from the photon counting sub-channels 40-1 to 40-M.

In this way, by using two or more parallel photon counting sub-channels per photon counting channel, where the parallel sub-channels are configured with different shaping times, an efficient and robust solution for solving the above-mentioned noise and pile-up problem is obtained. In particular, it is possible to optimize the effective signal-to-noise ratio at various radiation fluxes.

Using two or more comparators with different threshold levels corresponds to an energy-resolving photon-counting x-ray detector system, where each comparator and associated counter can be considered as an energy bin in a multi-bin system.

Figure 5:
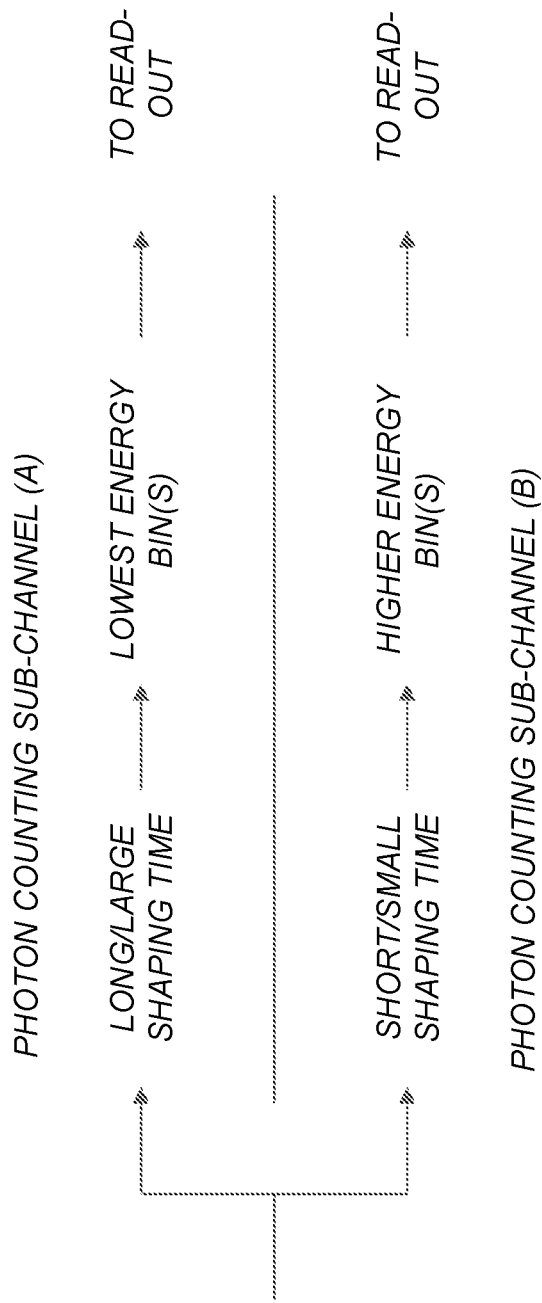
FIG. 5 is a simplified schematic diagram illustrating an example of a photon counting channel in which different sub-channels are optimized for different energy bins.

According to the proposed technology, the photon counting sub-channels, having shaping filters with different shaping times, may be adapted for counting photons of different energy levels, as schematically illustrated in FIG. 5.

In other words, the different sub-channels may be optimized for different energy levels/bins.

For example, a photon counting sub-channel (A) having a shaping filter with a larger shaping time may be adapted for counting photons of the lowest energy level(s) and a photon counting sub-channel (B) having a shaping filter with a smaller shaping time may be adapted for counting photons of higher energy level(s).

With a larger/longer shaping time, the noise is decreased and so the threshold for distinguishing low-energy photons from noise can be set to a lower value for the photon counting sub-channel having a shaping filter with a larger shaping time than would be possible for a shorter shaping time. In this way, otherwise lost counts can actually be registered.

As an example, the shaper with longer shaping time may be associated with the following thresholds: 5, 10 keV, whereas the shaper with shorter shaping time may be associated with the following thresholds: 10, 20, 30, 40, . . . keV.

An energy bin corresponds to an energy interval, defined by a lower limit and an upper limit as given by respective threshold levels. As an example, any pulses below 5 keV may be considered as noise, the lowest energy bin could be 5-10 keV, and the next energy bin 10-20 keV, followed by 20-30 keV, 30-40 keV and so forth.

Accordingly, a long shaping time (low noise) can be used to get the data for photon counts at energies lower than the minimum threshold for a shorter shaping time (higher noise). The lowest bin(s) would come from the long shaping time shaper and the other bins from the short shaping time shaper. At high count rates when pile-up kicks in one could possible weight down the lowest energy bin(s) or this can be accounted for in the subsequent image reconstruction.

Normally, the photon counting sub-channels have shaping times adapted for measuring the total amount of charge collected by per detector element, keeping in mind that the pulse height is proportional to the total charge collected by the detector element.

U.S. Pat. No. 9,482,764 discloses using two shapers to measure and correct for sharing of collected charge between adjacent detector elements or pixels. However, the shaping times are not adapted to minimize pile-up in any of the paths and therefore does not solve the objective problem address by the present technology.

Furthermore, in the present invention, unlike in U.S. Pat. No. 9,482,764, both shaping filters have shaping times adapted such that the pulse height is proportional to the total charge collected by the detector element, i.e. the pulse height is not affected by induced signals from adjacent detector elements. In addition, there no mention in U.S. Pat. No. 9,482,764 of optimizing different sub-channels for different energy levels.

In an example embodiment of the invention, the pulse amplitude is measured in each sub-channel as follows: when a comparator (such as the comparator with lowest threshold value) in a sub-channel registers the start of the pulse, a peak-finding circuit starts to search for the peak value of the pulse by comparing the pulse height to the comparator. This searching process takes place during a pre-defined pulse registration time, during which no new pulses can be registered. At the end of the pulse registration time, the maximum peak value encountered during the search is registered, and the sub-channel becomes free to register new pulses.

The pulse duration is dependent on the shaping time of the sub-channel. Using a shorter pulse registration time than the pulse duration may lead to double-counting of the same pulse, and using a longer pulse registration time than the pulse duration may lead to count loss.

In a particular example embodiment, a photon counting sub-channel with longer shaping time may therefore be configured to use a longer sample or pulse registration time than a sub-channel with shorter shaping time. In other words, the pulse registration time in each sub-channel may therefore be chosen to be similar to the duration of a typical pulse in that sub-channel. Accordingly, a larger pulse registration time may be used in a photon-counting sub-channel having a shaping filter with a larger shaping time and a smaller pulse registration time may be used in a photon counting sub-channel having a shaping filter with a smaller shaping time.

Figure 6:
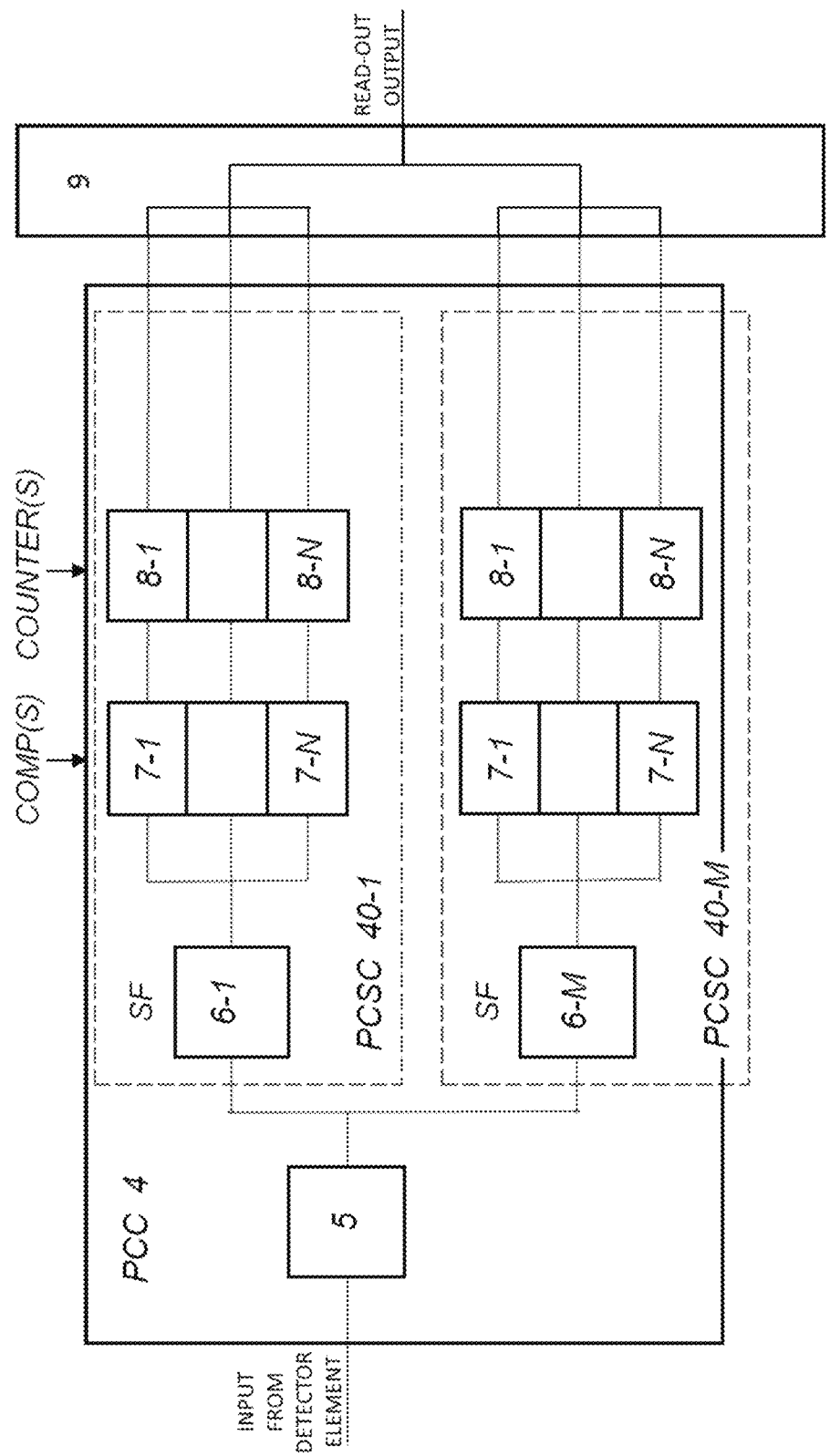
FIG. 6 is a schematic diagram illustrating an example of a photon counting channel according to an embodiment.

FIG. 6 is a schematic diagram illustrating an example of a photon counting channel according to an embodiment.

By way of example, each photon counting channel (PCC) 4 has at least one charge sensitive amplifier 5, and each photon counting sub-channel (PCSC) 40 includes a shaping filter 6 and a number, N≥1, of comparators 7-1 to 7-N and associated counters 8-1 to 8-N.

For example, each photon counting channel (PCC) 4 has a common charge sensitive amplifier 5 shared by the photon counting sub-channels (PCSC) 40-1 to 40-M, or each photon counting sub-channel has its own charge sensitive amplifier (not shown in FIG. 6), for providing an input signal to the shaping filters of the photon counting sub-channels.

Another type of embodiment will now be described in which the read-out unit may selectively switch between sub-channels depending on the photon flux rate.

In a particular example, the read-out unit 9 is preferably configured to selectively switch, for each photon counting channel (PCC), between the photon counting sub-channels (PCSC) 40-1 to 40-M based on photon flux rate when providing photon count outputs.

By way of example, the photon flux rate may be determined based on photon count output values. For example, the choice of photon counting sub-channel when providing the photon count output data may be based on actual or previously observed counter values. In particular, it can be noted that there is no need for any additional feedback path, since the read-out unit 9 already is connected to receive the photon count output data from the counters 8-1 to 8-N.

In a particular example, the read-out unit 9 is configured to select photon count output(s) from a photon counting sub-channel 40 having a shaping filter 6 with a smaller shaping time when the photon flux rate is higher than a flux threshold and select photon count output(s) from a photon counting sub-channel 40 having a shaping filter 6 with a larger shaping time when the photon flux rate is equal to or lower than the flux threshold.

More generally, as illustrated in the example of FIG. 6, each photon counting sub-channel (PCSC) 40 comprises a number, N≥1, of comparators 7-1 to 7-N, each having a respective comparator threshold level for comparison with an output signal of the shaping filter of the photon counting sub-channel to selectively trigger an associated counter.

Typically, the analog voltage in a comparator is set by a Digital-to-Analog Converter, DAC. The DAC converts a digital setting sent by a controller to an analog voltage with respect to which the photon-induced pulses can be compared. In order to determine the energy of the photon, it is necessary to know the translation between the digital settings sent to the DAC and the photon energy. This relationship can be expressed as: E=g×DS+m, where E is the energy of the photon, DS is the digital setting, g is referred to as the gain and m is referred to as the offset.

As mentioned, using two or more comparators with different threshold levels corresponds to an energy-resolving photon-counting x-ray detector system, where each comparator and associated counter can be considered as an energy bin in a multi-bin system.

The photon counting sub-channels (PCSC) 40 may have different numbers of comparators.

In a particular example, at least one of the photon counting sub-channel (PCSC) 40 has at least two comparators 7 with different comparator threshold levels and associated counters 8 for providing photon count outputs at different photon energy levels.

By way of example, a photon counting sub-channel having a shaping filter with a larger shaping time may be configured with a lower comparator threshold level for counting photons at the lowest energy level than a photon counting sub-channel having a shaping filter with a smaller shaping time.

It should be understood that at least two of the photon counting sub-channels (PCSC) may share a subset of the comparators and counters, except for the comparator and associated counter of the respective photon counting sub-channel that is configured for counting photons at the lowest energy level.

In a particular implementation example, the photon counting channels (PCC) are embedded in an application specific integrated circuit.

According to a second aspect there is provided an x-ray imaging system, for example like the one illustrated in FIG. 3, comprising an x-ray detector system as disclosed herein.

Expressed differently, the shaping filter in a conventional photon counting channel is replaced by two or more parallel shaping filters with different shaping times, each followed by means for thresholding and counting.

As an example, considering the example of two parallel shaping filters, it may be advisable to choose different shaping times, one time appropriate for low flux rates and a low threshold value, and one appropriate for high flux rates and a small shaping time. The first shaping filter will thus have a large shaping time allowing the use of a relatively small threshold value for the corresponding comparator(s), and will utilize as many photons as possible, including low energy photons, at a low rate. The output from this shaping filter and threshold means will thus be optimal for low rate. The second shaping filter will have a small shaping time allowing the use of a higher threshold value for the corresponding comparator(s), and will avoid pile-up and thus count as many photons as possible at a high rate. The output from this shaping filter and threshold means will thus be optimal for high rate. In addition, according to an example, there will also be a means to select, at each moment, which photon counting sub-channel associated with the first and the second shaping filter, respectively, to use when providing photon count output data.

In the following, a number of additional non-limiting embodiments will be described.

In certain applications, it can be important that one or several of the energy thresholds belonging to a shaper with longer shaping time is/are located at exactly the same energy as energy threshold(s) belonging to a shaper with shorter shaping time. For example, considering energy bins belonging to different shapers (and consequently different photon counting sub-channels). In this example, the lowest energy bin belonging to the first shaper is defined by two thresholds setting the lower limit (Thr_first_shaper_lower_limit) of the energy bin and the upper limit (Thr_first shaper_upper_limit) of the energy bin, respectively. Similarly, the lowest energy bin belonging to the second shaper is defined by two thresholds setting the lower limit (Thr_second_shaper_lower_limit) of the energy bin and the upper limit (Thr_second shaper_upper_limit) of the energy bin, respectively. It would thus be desirable, if the threshold defining the upper limit of the lowest energy bin for the first shaper coincides with the threshold defining the lower limit of the lowest energy bin for the second shaper, i.e. Thr_first shaper_upper_limit=Thr_second_shaper_lower_limit.

As an example, if the first shaper with longer shaping time is associated with the thresholds 5 and 10 keV, and the second shaper with shorter shaping time is associated with the thresholds 10, 20, 30, 40, . . . keV, the 10 keV thresholds should be calibrated to coincide.

In this case it is important to avoid small discrepancies between the thresholds that could cause either missed counts or double counts.

By way of example, the calibration can be done in the following way:

The detector is irradiated with an x-ray flux low enough that none of the shapers lose counts due to pile-up. In this case, both shapers should give the same number of registered counts if the threshold locations are equal. All thresholds belonging to one of the shapers are placed at an energy level higher than the noise floor. Their values are then kept constant while one of the thresholds belonging to the other shaper is adjusted such that the number of counts above this threshold is equal to the number of counts in the corresponding threshold in the other shaper.

Figure 7:
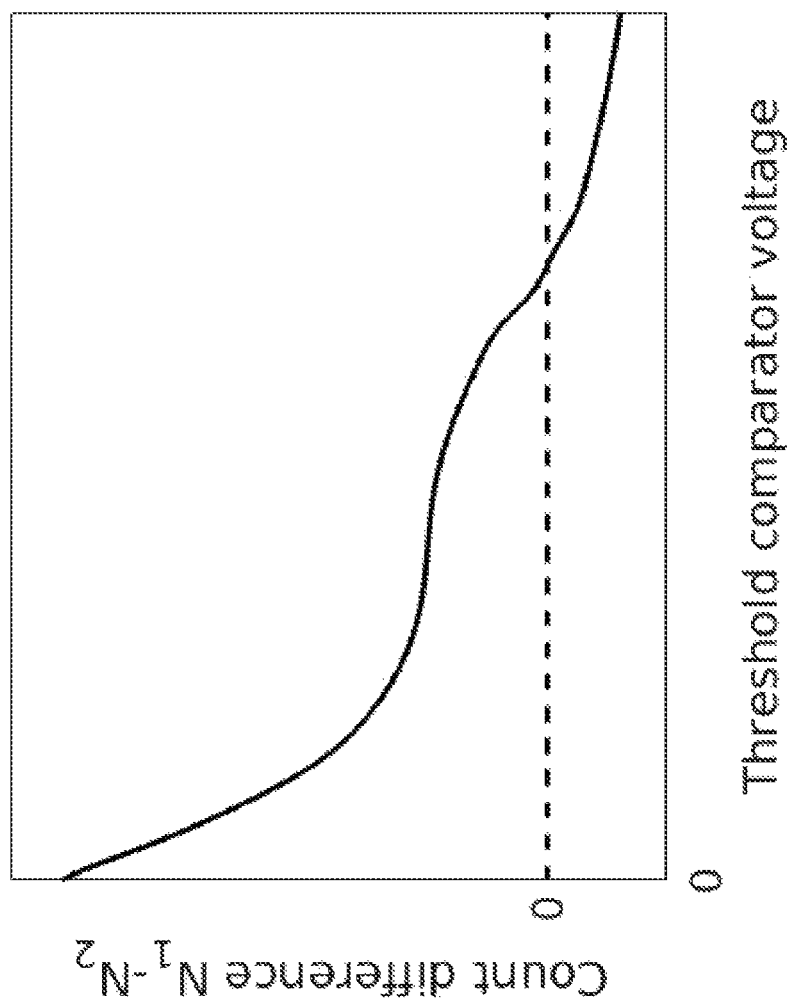
FIG. 7 is a schematic diagram illustrating an example of a difference ($N_1-N_2$) in counts above the threshold for the shaper with long shaping time ($N_1$) and for the short shaping time ($N_2$) as a function of the comparator voltage value.

FIG. 7 shows an example of the difference ($N_1-N_2$) in counts above the threshold for the shaper with long shaping time ($N_1$) and for the short shaping time ($N_2$) as a function of the comparator voltage value. To get equal threshold energies for the two thresholds, the DAC voltage is set at the point where the counts difference is zero.

In short, the thresholds that are calibrated against each other measure pulse trains which have been processed through different shaping filters, and the calibration is based on finding the precise threshold energy level where the difference in counts above the thresholds crosses over from positive to negative.

More generally, the threshold settings of comparators associated with different photon counting sub-channels (and thus different shaping filters) may thus be configured such that the number of counts above a comparator threshold level used in one of the photon counting sub-channels is equal to the number of counts above a corresponding comparator threshold level used in another of the photon counting sub-channels, under irradiation with an x-ray flux low enough that none of the photon counting sub-channels lose counts due to pile-up.

In some applications, high energy resolution is important. For example, in imaging situations where an iodinated contrast agent is used, it is important to measure the incident energy spectrum with high energy resolution near the iodine k-edge at 33.2 keV in order to separate iodine from calcium. The energy resolution is higher for a long shaping time than for a short shaping time, since a long shaping time gives a broad pulse, whose height does not vary much close to its peak value, making it easy to measure its height with clock-triggered sampling. For this reason, it can be beneficial to set one or several of the thresholds belonging to the shaper with long shaping time in a selected part of the measured x-ray energy range where high energy resolution is important for obtaining optimal image quality, e.g. near the k-edge of iodine. In this way, the important part of the x-ray energy range is measured with higher energy resolution than the energy resolution achievable with the shaper with short shaping time.

Accordingly, two or more of the threshold levels of the photon counting sub-channel having a shaping filter with a larger shaping time are therefore distributed in a selected, limited part of the measured x-ray energy range with a closer interval than for the photon counting sub-channel having a shaping filter with a smaller shaping time to enable selective higher-energy resolution.

In yet another set of example embodiments, the registered counts in energy bins belonging to the two shapers can optionally be used together to perform basis material decomposition. This technique utilizes the fact that all substances built up from elements with low atomic number, such as human tissue, have linear attenuation coefficients $\mu(E)$ whose energy dependence can be expressed, to a good approximation, as a linear combination of two basis functions:

$$\mu(E) = a_1 f_1(E) + a_2 f_2(E).$$

If an element with a K-edge in the measured x-ray energy range, e.g. Iodine, is present in the image, its attenuation coefficient must be added as a third basis function. In basis material decomposition, the integral of each of the basis coefficients, $A_i = \int a_i dl$ for $i=1, \ldots, B$ where B is the number of basis functions, is inferred from the measured data in each projection ray l from the source to a detector element. This allows quantitative measurement of material composition and density within the field of view. In order to achieve this, it is necessary to know the joint probability distribution $p(n_{1,1}, \ldots, n_{1,M_1}, n_{2,1}, \ldots, n_{2,M_2} | A_1, \ldots, A_B)$ of the counts $n_{1,i}$ in each of the $M_1$ energy bins belonging to the first shaper and the counts $n_{2,i}$ in each of the $M_2$ energy bins belonging to the second shaper, for given line integrals of basis coefficients $A_1, \ldots, A_B$.

This distribution can be obtained from measurements or Monte Carlo simulations of the number of registered counts in each energy bin for x-ray beams transmitted through different combinations of materials. Basis material decomposition is then performed by estimating said line integrals of basis coefficients $A_1, \ldots, A_B$ from the registered bin counts $n_{1,i}$ and $n_{2,i}$ using a statistical estimator. In one embodiment of the invention, this estimator is a maximum likelihood estimator, given by:

$$\hat{A}_1, \ldots, \hat{A}_B = \underset{A_1,\ldots,A_B}{\mathrm{argmax}}\, p(n_{1,1}, \ldots, n_{1,M_1}, n_{2,1}, \ldots, n_{2,M_2} | A_1, \ldots, A_B)$$

Here $\hat{A}_i$ denotes an estimate of $A_i$. Maximum-likelihood basis decomposition as such has been described previously, e.g. in Roessl and Proksa, *K-edge imaging in x-ray computed tomography using multi-bin photon counting detectors*, Phys. Med. Biol. 52 (2007), 4679-4696.

However, the method presented here is different from previously described methods since it involves optimizing a joint likelihood function for different sets of energy bins belonging to different photon-counting sub-channels (having different shapers) which measure the output of the same detector element. Since the method uses the joint probability distribution of counts in the energy bins belonging to the different shapers, the pile-up loss in each of the shapers is automatically corrected for, and the fact that both shapers measure the same incoming pulse train is automatically taken into account in the estimation of $A_1, \ldots, A_B$.

Accordingly, the corresponding x-ray imaging system may be configured to perform basis material decomposition based on the photon count outputs from different photon-counting sub-channels having shaping filters with different shaping times.

Preferably, the x-ray imaging system may be configured to optimize a joint likelihood function for different sets of energy bins belonging to different photon-counting sub-channels, which measure the output of the same detector element.

In another optional aspect of the invention, it may be desirable to explicitly correct the registered counts for pile-up. This is especially the case for the energy bins belonging to the shaper with long shaping time, since pile-up is more severe for a long shaping time. This may be the case e.g. if it is desired to generate an energy weighted sum of energy bin images to the operator, a procedure called energy weighting. In this case the weighted sum may include images from energy bins corresponding to the first shaper and energy bins corresponding to the second shaper. If left uncorrected, pileup will cause artifacts in the resulting image. Another case when correcting for pileup is desirable is as a pre-correction step for basis material decomposition. In this case, the corrected counts in the different energy bins are used as input to a basis material decomposition algorithm, which estimates the line integrals of basis coefficients $A_1, \ldots, A_B$, which describe the material composition along the beam path.

Therefore, it may be desirable to correct for pileup by estimating the number of actual incident photons in each energy bin, given the registered number of counts in each energy bin. One way that this may be accomplished is by establishing a relationship $\lambda_{k,i}^{out} = f_{k,i}(\lambda_{k,i}^{in})$ between the incident counts $\lambda_{k,i}^{out}$ and the registered counts with pileup $\lambda_{k,i}^{out}$, in each measurement in energy bin i belonging to shaper k. This can be done with measurements of the registered count rate for different input count rates or by Monte Carlo simulations. The correction for pileup is then made by inverting the function $f_{k,i}$: $\lambda_{k,i}^{in} = f_{k,i}^{-1}(\lambda_{k,i}^{out})$. However, this simplified method does not take into account that the pileup is spectrum-dependent, i.e. that the relationship between input and output count rate is different for incident x-ray spectra with different beam quality. For example, a detector may be configured such that there is a fixed dead time after each pulse during which no new counts can be registered. A detector may furthermore be configured such that a pulse arriving during the dead time period may still be registered at the end of the dead time period if its signal level is still above the lowest threshold. In this case an x-ray spectrum consisting of predominantly low energies will give more lost counts due to pileup than an x-ray spectrum consisting of predominantly high energies. This is caused by the fact that a count arriving during a dead time period is more likely to still have a signal level above threshold at the end of the dead time period if it is a high-energy pulse than if it is a low-energy pulse. In other detector configurations, e.g. where the dead time is dependent on the time during which the signal level is above threshold, the dependence may be the opposite, i.e. an x-ray spectrum dominated by high energies may give rise to more pile-up than a spectrum dominated by low energies.

In this particular example, we therefore propose using the spectrum information in the energy bins belonging to the shaper with short shaping time to estimate the number of incident photons in one or more of the energy bins belonging to all shapers more accurately. In particular, this means that the spectrum information in the energy bins corresponding to the shaper with short shaping time may be used to correct the spectrum information in the shaper with long shaping time. This is preferable to treating the bin counts from the different shapers separately, since energy information is less degraded by pileup in the shaper with short shaping time compared to the shaper with long shaping time, so that a better correction to the bin counts corresponding to the shaper with long shaping time can be made. The correction may be made as follows: Using measurements or Monte Carlo simulations, a relationship between the incident and the registered number of counts in each energy bin $\lambda_{k,i}^{out} = f_{k,i}(\lambda_{k,i}^{in}, S_1, \ldots, S_{N_S})$, as a function of one or more spectrum parameters $S_1, \ldots, S_{N_S}$ describing the set of possible incident x-ray spectrum shapes, may be established. Then, during a measurement, the distribution of registered counts in the energy bins corresponding to the shaper with high shaping time are used to estimate the spectrum parameters $S_1 \ldots S_{N_S}$ describing the x-ray spectrum. These spectrum parameters are then used, together with the relationship between the incident and the registered number of counts in each energy bin $\lambda_{k,i}^{out} = f_{k,i}(\lambda_{k,i}^{in}, S_1, \ldots, S_{N_S})$, to estimate the incident counts $\lambda_{k,i}^{in}$ in all energy bins corresponding to all shapers. This can for example be done by solving the equation $\lambda_{k,i}^{out} f_{k,i} = (\lambda_{k,i}^{in}, S_1, \ldots, S_{N_S})$ for $\lambda_{k,i}^{in}$. The $N_S$ spectrum parameters $S_1 \ldots S_{N_S}$ describing the beam quality can for example consist of a single parameter, the half-value layer of aluminum. In another example, the spectrum parameters $S_1 \ldots S_{N_S}$ may be the spectral density in each of $N_S$ energy intervals.

Accordingly, the x-ray imaging system may for example be configured to estimate the number of incident photons based on the photon count outputs from different photon-counting sub-channels having shaping filters with different shaping times.

By way of example, the x-ray imaging system may be configured to estimate a number of spectrum parameters based on the photon-count outputs from at least one photon-counting sub-channel, and to estimate the number of incident photons from said spectrum parameters and from photon-count outputs from at least one photon-counting sub-channel.

In a particular example, the x-ray imaging system is configured to estimate the number of incident photons in at least one energy bin belonging to one or more of the photon-counting sub-channels based on spectrum parameters related to energy bins belonging to a photon-counting sub-channel having a shaping filter with a short shaping time.

It will be appreciated that the mechanisms and arrangements described herein can be implemented, combined and re-arranged in a variety of ways.

For example, embodiments may be implemented in hardware, or at least partly in software for execution by suitable processing circuitry, or a combination thereof.

The steps, functions, procedures, and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, and/or blocks described herein may be implemented in software such as a computer program for execution by suitable processing circuitry such as one or more processors or processing units.

Figure 8:
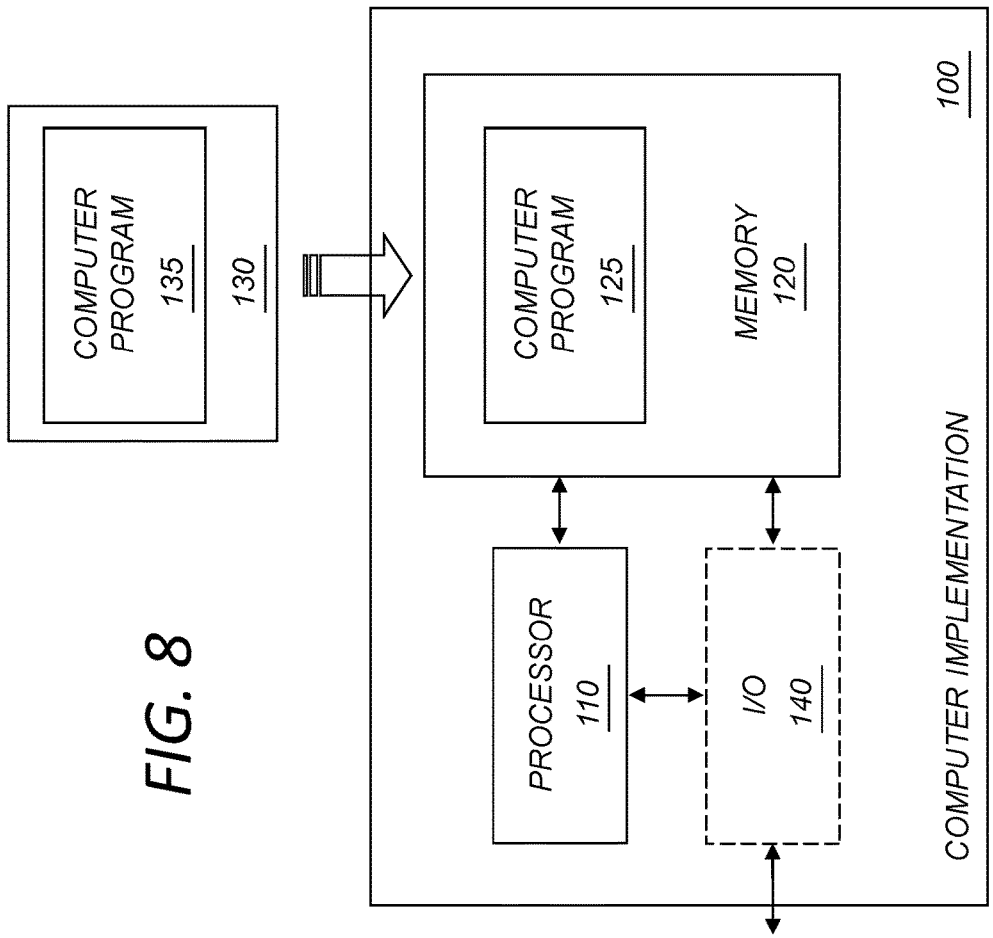
FIG. 8 is a schematic diagram illustrating an example of a computer-implementation according to an embodiment.

FIG. 8 is a schematic diagram illustrating an example of a computer-implementation 100 according to an embodiment. In this particular example, at least some of the steps, functions, procedures, modules and/or blocks described herein are implemented in a computer program 125; 135, which may be loaded from an external memory device 130 into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An x-ray detector system comprising a multitude of detector elements, each connected to a respective photon counting channel (PCC) for providing at least one photon count output, and a read-out unit connected to the photon counting channels for outputting the photon count outputs,
wherein each one of at least a subset of the photon counting channels (PCC) comprises at least two photon counting sub-channels, each photon counting sub-channel providing at least one photon count output and having a shaping filter, wherein the shaping filters of the photon counting sub-channels are configured with different shaping times,
wherein the photon counting sub-channels, having shaping filters with different shaping times, are adapted for counting photons of different energy levels;
the read-out unit is configured to select, for each photon counting channel (PCC), photon count outputs from the photon counting sub-channels; and
wherein the read-out unit is configured to selectively switch, for each photon counting channel (PCC), between the photon counting sub-channels based on photon flux rate when providing photon count outputs.

2. The x-ray detector system of claim 1, wherein a photon counting sub-channel having a shaping filter with a larger shaping time is adapted for counting photons of the lowest energy level(s) and a photon counting sub-channel having a shaping filter with a smaller shaping time is adapted for counting photons of higher energy level(s).

3. The x-ray detector system of claim 2, wherein a threshold for distinguishing low-energy photons from noise is set to a lower value for the photon counting sub-channel having a shaping filter with a larger shaping time than would be possible for a smaller shaping time.

4. The x-ray detector system of claim 1, wherein each photon counting channel (PCC) has a common charge sensitive amplifier shared by the photon counting sub-channels, or each photon counting sub-channel has its own charge sensitive amplifier, for providing an input signal to the shaping filters of the photon counting sub-channels.

5. The x-ray detector system of claim 1, wherein the photon counting sub-channels have shaping times adapted for measuring the total amount of charge collected by per detector element.

6. The x-ray detector system of claim 1, wherein a larger pulse registration time is used in a photon-counting sub-channel having a shaping filter with a larger shaping time and a smaller pulse registration time is used in a photon counting sub-channel having a shaping filter with a smaller shaping time.

7. The x-ray detector system of claim 1, wherein the photon flux rate is determined based on photon count output values.

8. The x-ray detector system of claim 1, wherein the read-out unit is configured to select photon count output(s) from a photon counting sub-channel having a shaping filter with a smaller shaping time when the photon flux rate is higher than a flux threshold and select photon count output(s) from a photon counting sub-channel having a shaping filter with a larger shaping time when the photon flux rate is equal to or lower than the flux threshold.

9. The x-ray detector system of claim 1, wherein each photon counting sub-channel comprises a number, $N \geq 1$, of comparators, each having a respective comparator threshold level for comparison with an output signal of the shaping filter of the photon counting sub-channel to selectively trigger an associated counter.

10. The x-ray detector system of claim 9, wherein at least one photon counting sub-channel has at least two comparators with different comparator threshold levels and associated counters for providing photon count outputs at different photon energy levels.

11. The x-ray detector system of claim 10, wherein at least two of the photon counting sub-channels share a subset of the comparators and counters, except for the comparator and associated counter of the respective photon counting sub-channel that is configured for counting photons at the lowest energy level.

12. The x-ray detector system of claim 9, wherein a photon counting sub-channel having a shaping filter with a larger shaping time is configured with a lower comparator threshold level for counting photons at the lowest energy level than a photon counting sub-channel having a shaping filter with a smaller shaping time.

13. The x-ray detector system of claim 9, wherein the threshold settings of comparators associated with different photon counting sub-channels are configured such that the number of counts above a comparator threshold level used in one of the photon counting sub-channels is equal to the number of counts above a corresponding comparator threshold level used in another of the photon counting sub-channels, under irradiation with an x-ray flux low enough that none of the photon counting sub-channels lose counts due to pile-up.

14. The x-ray detector system of claim 9, wherein two or more of the threshold levels of the photon counting sub-channel having a shaping filter with a larger shaping time are therefore distributed in a selected, limited part of the measured x-ray energy range with a closer interval than for the photon counting sub-channel having a shaping filter with a smaller shaping time to enable selective higher-energy resolution.

15. The x-ray detector system of claim 1, wherein the photon counting channels (PCC) are embedded in an application specific integrated circuit.

16. An x-ray imaging system comprising an x-ray detector system of claim 1.

17. The x-ray imaging system of claim 16, wherein the x-ray imaging system is configured to perform basis material decomposition based on the photon count outputs from different photon-counting sub-channels having shaping filters with different shaping times.

18. The x-ray imaging system of claim 17, wherein the x-ray imaging system is configured to optimize a joint likelihood function for different sets of energy bins belonging to different photon-counting sub-channels, which measure the output of the same detector element.

19. The x-ray imaging system of claim 16, wherein the x-ray imaging system is configured to estimate the number of incident photons based on the photon count outputs from different photon-counting sub-channels having shaping filters with different shaping times.

20. The x-ray imaging system of claim 16, wherein the x-ray imaging system is configured to estimate a number of spectrum parameters based on the photon-count outputs from at least one photon-counting sub-channel, and to estimate the number of incident photons from said spectrum parameters and from photon-count outputs from at least one photon-counting sub-channel.

21. The x-ray imaging system of claim 20, wherein the x-ray imaging system is configured to estimate the number of incident photons in at least one energy bin belonging to one or more of the photon-counting sub-channels based on spectrum parameters related to energy bins belonging to a photon-counting sub-channel having a shaping filter with a short shaping time.

\* \* \* \* \*